United States Patent
Kobayashi et al.

(10) Patent No.: US 12,282,978 B2
(45) Date of Patent: Apr. 22, 2025

(54) INFORMATION PROCESSING APPARATUS AND METHOD

(71) Applicant: TOYOTA JIDOSHA KABUSHIKI KAISHA, Toyota (JP)

(72) Inventors: Ryosuke Kobayashi, Nagakute (JP); Koichi Watanabe, Tokyo-to (JP); Motofumi Kamiya, Nagoya (JP); Masaki Nishino, Anjo (JP); Jean-Sebastien Boire, Yokohama (JP); Takuya Nishioka, Nagoya (JP); Yohei Nakanishi, Nagoya (JP); Masaki Makihara, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/442,475

(22) Filed: Feb. 15, 2024

(65) Prior Publication Data

US 2024/0303762 A1     Sep. 12, 2024

(30) Foreign Application Priority Data

Mar. 9, 2023   (JP) ................... 2023-036834

(51) Int. Cl.
G06Q 50/40 (2024.01)
G06Q 10/02 (2012.01)

(52) U.S. Cl.
CPC ............ *G06Q 50/40* (2024.01); *G06Q 10/02* (2013.01)

(58) Field of Classification Search
CPC ............... B60L 53/665; B60L 2240/62; B60L 2240/68; G06Q 10/02
See application file for complete search history.

(56) References Cited

U.S. PATENT DOCUMENTS

| | | | |
|---|---|---|---|
| 2016/0025506 A1* | 1/2016 | Penilla ............... | G01C 21/3407 701/430 |
| 2017/0146354 A1* | 5/2017 | Boss .................. | G01C 21/3438 |
| 2019/0126768 A1 | 5/2019 | Niwa et al. | |
| 2020/0034791 A1* | 1/2020 | Lee .................. | G06Q 10/06315 |
| 2023/0014378 A1* | 1/2023 | Ciesco .................. | B60L 58/16 |

FOREIGN PATENT DOCUMENTS

JP       2019086841 A     6/2019

OTHER PUBLICATIONS

Hongming Yang, Electric Vehicle Route Selection and Charging Navigation Strategy Based on Crowd Sensing, p. 2214-2216, 2017 (Year: 2017).*

* cited by examiner

*Primary Examiner* — Ibrahim N El-Bathy
(74) *Attorney, Agent, or Firm* — KENJA IP LAW PC

(57) ABSTRACT

An information processing apparatus includes a controller configured to accept a reservation for use of a vehicle charging service from a user of a vehicle, notify the user of a first joining point and a first joining time as a target joining point and a target joining time at which the vehicle joins a power supply vehicle, determine whether the vehicle can arrive at the first joining point by the first joining time based on positional information and traffic congestion information for the vehicle, determine a second joining point closer to the vehicle than the first joining point upon determining that the vehicle cannot arrive, and notify the user of a proposal to change the target joining point to the second joining point.

6 Claims, 6 Drawing Sheets

INFORMATION PROCESSING APPARATUS AND METHOD

CROSS-REFERENCE TO RELATED APPLICATION

This application claims priority to Japanese Patent Application No. 2023-036834 filed on Mar. 9, 2023, the entire contents of which are incorporated herein by reference.

TECHNICAL FIELD

The present disclosure relates to an information processing apparatus and a method.

BACKGROUND

Technology for providing a vehicle charging service in a case in which the charge amount of a battery of a vehicle is equal to or less than a predetermined value is known. For example, Patent Literature (PTL) 1 discloses that a rescue vehicle goes to the position of a vehicle, calculates the electrical energy that enables to travel to the next charging station, and supplies power.

CITATION LIST

Patent Literature

PTL 1: JP 2019-086841 A

SUMMARY

In a conventional vehicle charging service, a power supply vehicle joins a vehicle at a predetermined location at a predetermined time, thereby supplying power; however, a delay in arrival of a vehicle of a user using the vehicle charging service may cause the power supply vehicle, which has arrived earlier, to wait for an unnecessary time period. Thus, there is room for improvement with respect to technology for providing vehicle charging services.

It would be helpful to improve technology for providing vehicle charging services.

An information processing apparatus according to an embodiment of the present disclosure includes a controller configured to:

accept a reservation for use of a vehicle charging service from a user of a vehicle;

notify the user of a first joining point and a first joining time as a target joining point and a target joining time at which the vehicle joins a power supply vehicle;

determine whether the vehicle can arrive at the first joining point by the first joining time based on positional information and traffic congestion information for the vehicle;

determine a second joining point closer to the vehicle than the first joining point upon determining that the vehicle cannot arrive; and notify the user of a proposal to change the target joining point to the second joining point.

According to an embodiment of the present disclosure, technology for providing vehicle charging services can be improved.

DETAILED DESCRIPTION

An embodiment of the present disclosure will be described below, with reference to the drawings. In the descriptions of the present embodiment, detailed descriptions of the same or corresponding portions are omitted or simplified, as appropriate.

Outline of Embodiment

Figure 1:
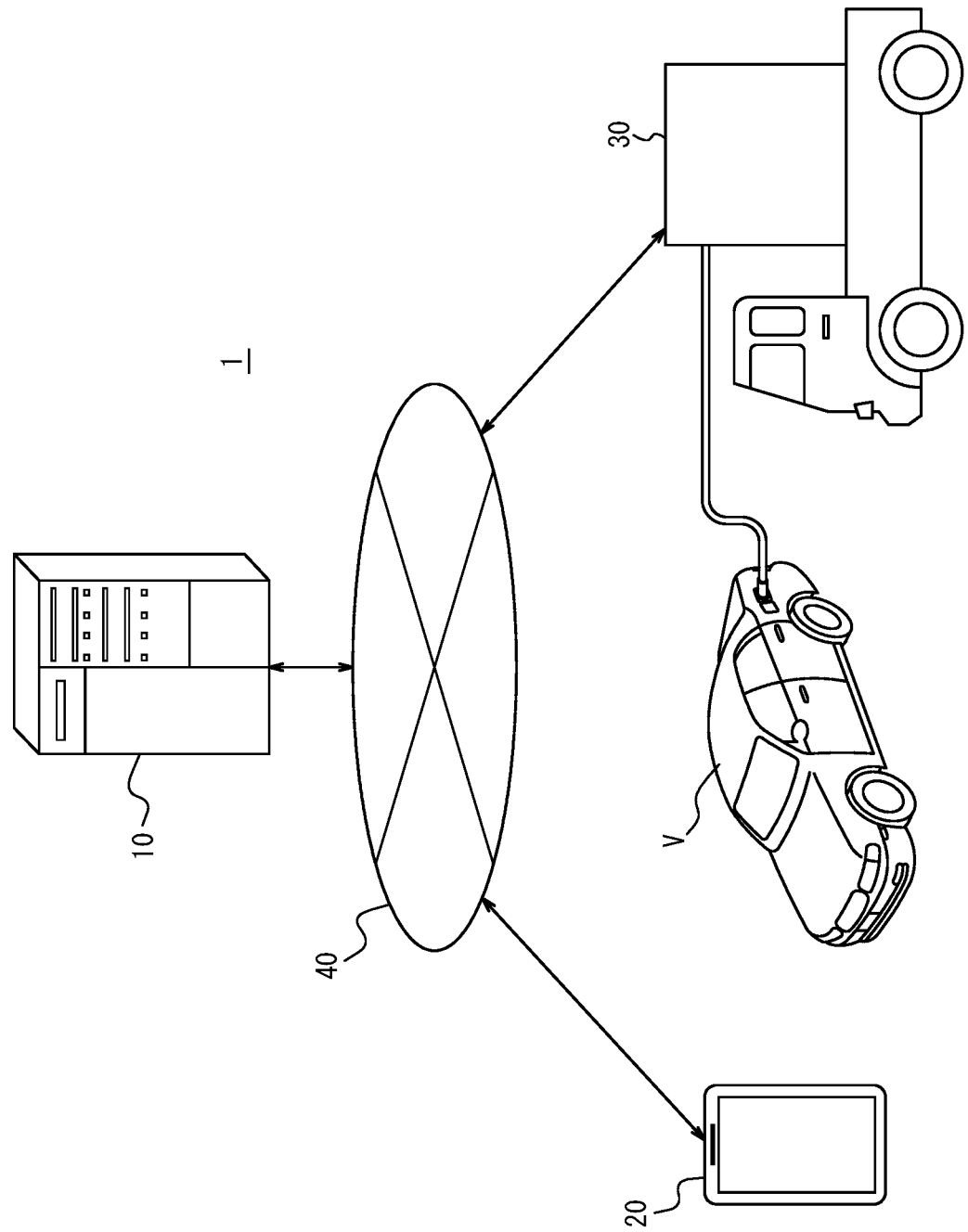
FIG. 1 is a diagram illustrating a schematic configuration of a system according to an embodiment of the present disclosure.

An outline of a system 1 according to an embodiment of the present disclosure will be described with reference to FIG. 1. The system 1 includes an information processing apparatus 10, a terminal apparatus 20, and a power supply vehicle 30. The information processing apparatus 10, the terminal apparatus 20, and the power supply vehicle 30 are communicably connected to a network 40 including, for example, the Internet, a mobile communication network, and the like.

The system 1 for the present embodiment is used to provide so-called run-of-the-mill charging services. Rush charging service is a service in which the power supply vehicle 30 that receives a request from a user who wishes to charge his/her vehicle V joins the user's vehicle V and charge the vehicle V.

The information processing apparatus 10 is, for example, a server apparatus but is not limited to this and may be any appropriate computer. The information processing apparatus 10 can communicate with the terminal apparatus 20 via the network 40.

The terminal apparatus 20 is any computer used by the user. For example, a general purpose computer such as a smartphone or a tablet terminal, or a dedicated computer can be employed as the terminal apparatus 20. Alternatively, the terminal apparatus 20 may be an automotive navigation system installed in the user's vehicle V. For example, a user can use the terminal apparatus 20 to make a reservation for use of the vehicle charging service, confirm a notification from the information processing apparatus 10, and reply to the notification.

The power supply vehicle 30 is a device for supplying power with a storage battery that can be installed on the ground to charge the vehicle V, or a vehicle equipped with a storage battery. The power supply vehicle 30 is an automobile, for example, but is not limited to this and may be any appropriate vehicles. Each of the automobiles is, for example, a Battery Electric Vehicle (BEV), a Hybrid Electric Vehicle (HEV), a Plug-in Hybrid Electric Vehicle (PHEV), a Fuel Cell Electric Vehicle (FCEV), or the like, but is not limited to these. The power supply vehicle 30 may be operated directly or remotely by the driver. Alternatively, the power supply vehicle 30 may be capable of automated driving such as any one of Level 1 to Level 5 as defined by the Society of Automotive Engineers (SAE), for example. The system 1 may include any number greater than two of power supply vehicles 30. In the present embodiment, the power supply vehicle 30 is managed by an operator that provides vehicle charging services. The power supply vehicle 30 heads to the first joining point or the second joining point determined by the information processing apparatus 10 to charge the vehicle V.

The network 40 includes the Internet, at least one WAN, at least one MAN, or a combination thereof. The term "WAN" is an abbreviation of wide area network. The term "MAN" is an abbreviation of metropolitan area network. The network 40 may include at least one wireless network, at least one optical network, or a combination thereof. The wireless network is, for example, an ad hoc network, a cellular network, a wireless LAN, a satellite communication network, or a terrestrial microwave network. The term "LAN" is an abbreviation of local area network.

The vehicle V is any type of automobile that uses electric power for at least part of its drive, such as a BEV, PHEV, or FCEV. The vehicle V is the vehicle in which the user rides.

First, an outline of the present embodiment will be described, and details thereof will be described later. The information processing apparatus 10 accepts a reservation for use of the vehicle charging service from a user of the vehicle V and notifies the user of the first joining point and the first joining time as the target joining point and target joining time where the vehicle V will join the power supply vehicle 30. The information processing apparatus 10 determines whether or not the vehicle V can arrive at the first joining point by the first joining time based on the positional information and the traffic congestion information for the vehicle V, and if it is determined that the vehicle V cannot arrive, it determines the second joining point that is closer to the vehicle V than the first joining point. The information processing apparatus 10 then notifies the user of the proposal to change the target joining point to the second joining point.

Thus, according to the present embodiment, when a reservation for use of the vehicle charging service is accepted from a user of the vehicle V, the first joining point and the first joining time are notified to the user. Here, for example, if the vehicle V cannot arrive at the first joining point by the first joining time, the power supply vehicle 30 will have wasted waiting time. In contrast, according to the present embodiment, if it is determined that the vehicle V cannot arrive at the first joining point by the first joining time, a second joining point closer to the vehicle V than the first joining point is notified to the user as the target joining point. If the vehicle V changes the target joining point to the second joining point and both vehicles join at the second joining point, the waiting time of the power supply vehicle 30 can be reduced. This will improve the technology for providing vehicle charging services.

Next, configurations of the system 1 will be described in detail.

(Configuration of Information Processing Apparatus)

Figure 2:
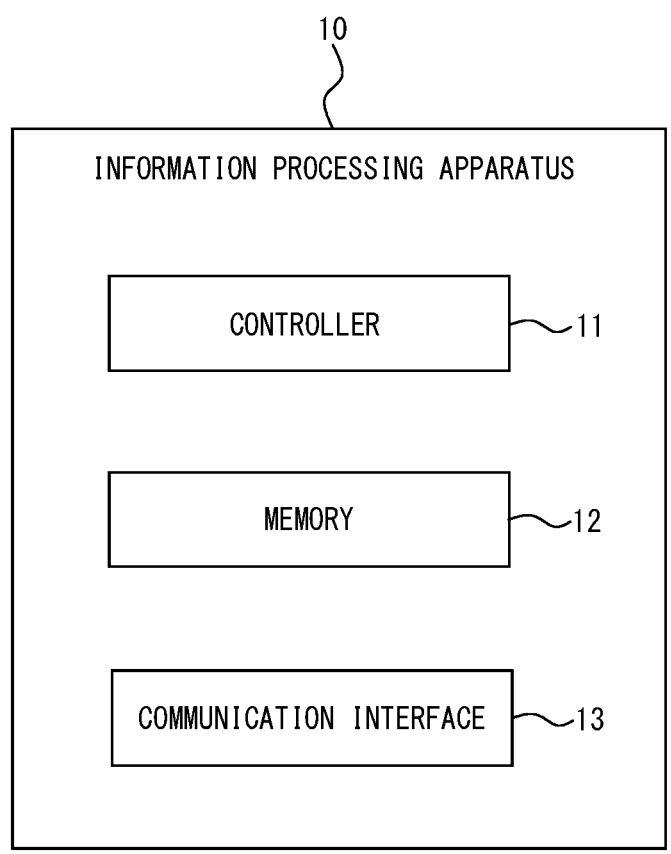
FIG. 2 is a block diagram illustrating a schematic configuration of an information processing apparatus.

As illustrated in FIG. 2, the information processing apparatus 10 includes a controller 11, a memory 12, and a communication interface 13.

The controller 11 includes at least one processor, at least one programmable circuit, at least one dedicated circuit, or a combination of these. The processor is a general purpose processor such as a central processing unit (CPU) or a graphics processing unit (GPU), or a dedicated processor that is dedicated to specific processing, for example, but is not limited to these. The programmable circuit is a field-programmable gate array (FPGA), for example, but is not limited to this. The dedicated circuit is an application specific integrated circuit (ASIC), for example, but is not limited to this. The controller 11 controls operations of the entire information processing apparatus 10.

The memory 12 includes one or more memories. The memories are semiconductor memories, magnetic memories, optical memories, or the like, for example, but are not limited to these. The memories included in the memory 12 may each function as, for example, a main memory, an auxiliary memory, or a cache memory. The memory 12 stores any information used for operations of the information processing apparatus 10. For example, the memory 12 may store a system program, an application program, embedded software, and the like. The information stored in the memory 12 may be updated with, for example, information acquired from the network 40 via the communication interface 13.

The communication interface 13 includes at least one interface for communication for connecting to the network 40. The interface for communication is compliant with mobile communication standards such as the 4th generation (4G) standard and the 5th generation (5G) standard, a wired local area network (LAN) standard, a wireless LAN standard, or the like, for example, but not limited to these, and may be compliant with any communication standard. In the present embodiment, the information processing apparatus 10 communicates with the terminal apparatus 20 and the power supply vehicle 30 via the communication interface 13 and the network 40.

(Configuration of Terminal Apparatus)

Figure 3:
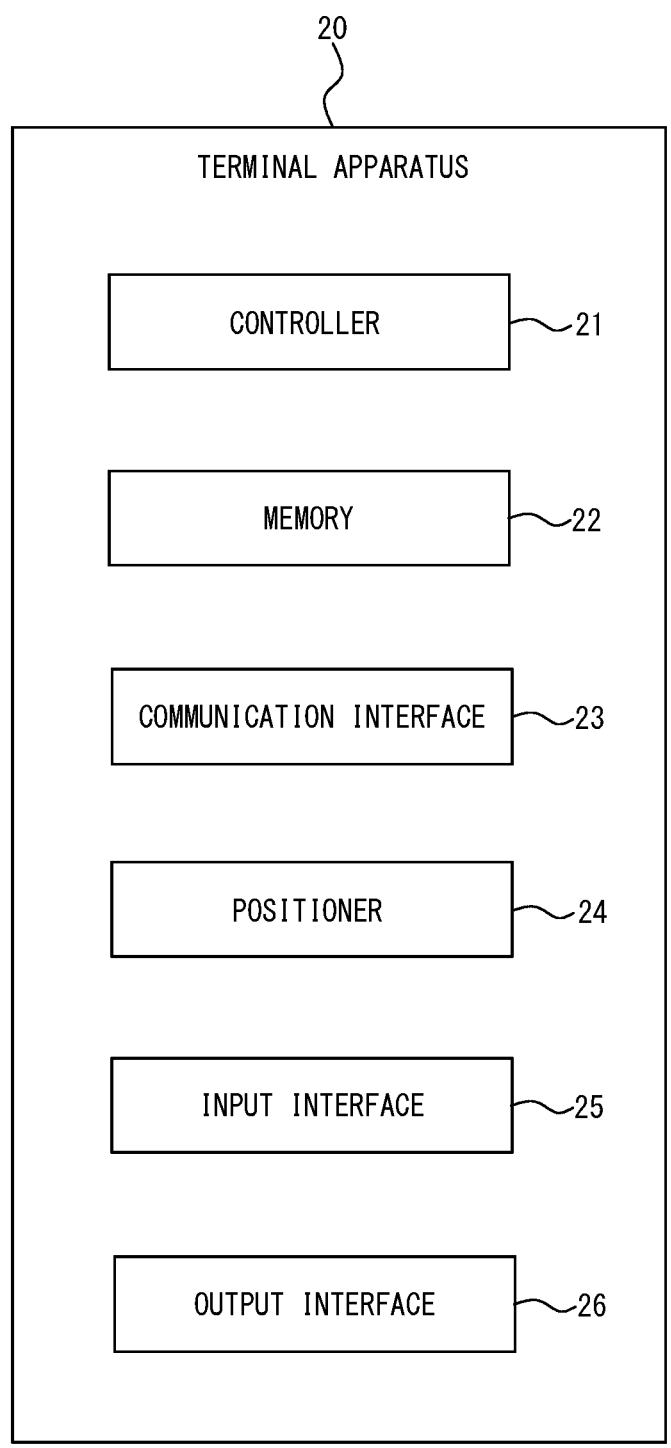
FIG. 3 is a block diagram illustrating a schematic configuration of a terminal apparatus.

As illustrated in FIG. 3, the terminal apparatus 20 includes a controller 21, a memory 22, a communication interface 23, a positioner 24, an input interface 25, and an output interface 26.

The controller 21 includes at least one processor, at least one programmable circuit, at least one dedicated circuit, or a combination of these. The controller 21 controls operations of the entire terminal apparatus 20.

The memory 22 includes one or more memories. The memories included in the memory 22 may each function as, for example, a main memory, an auxiliary memory, or a cache memory. The memory 22 stores any information to be used for operations of the information processing apparatus 10. For example, the memory 22 may store a system program, an application program, a database, map information, and the like. The information stored in the memory 22 may be updated with, for example, information acquired from the network 40 via the communication interface 23.

The communication interface 23 includes at least one interface for communication for connecting to the network 40. The interface for communication is compliant with, for example, a mobile communication standard, a wired LAN standard, or a wireless LAN standard, but not limited to these, and may be compliant with any communication standard. In the present embodiment, the terminal apparatus 20 communicates with the information processing apparatus 10 via the communication interface 23 and the network 40.

The positioner 24 includes at least one apparatus for acquiring positional information for the terminal apparatus 20. Specifically, the positioner 24 includes a receiver corresponding to the Global Positioning System (GPS), for example, but is not limited to this and may include a receiver corresponding to any satellite positioning system. If the terminal apparatus 20 is a car navigation system installed in a vehicle V, the positional information for the terminal apparatus 20 may be treated as the positional information for the vehicle V.

The input interface 25 may include at least one input device for detecting user input. The input device is a physical key, a capacitive key, a touch screen integrally provided with a display, a microphone for accepting audio input, a camera, or the like, for example, but is not limited to these. The input interface 25 may include an interface for connecting to an external input device.

The output interface 26 may include at least one output device for outputting information to notify the user of the information. The output device is a display for outputting information as video, a speaker for outputting information as audio, or the like, for example, but is not limited to these. The output interface 26 may include an interface for connecting to an external output device.

(Configuration of Power Supply Vehicle)

Figure 4:
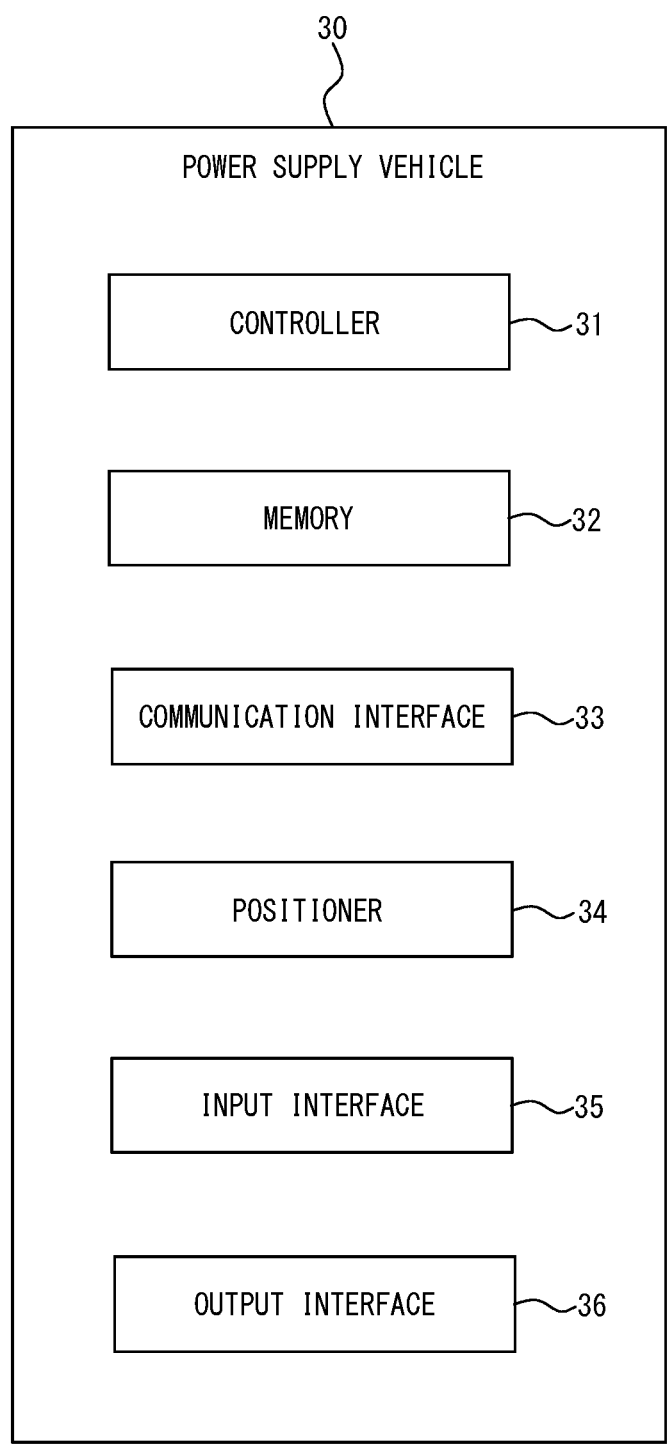
FIG. 4 is a block diagram illustrating a schematic configuration of a power supply vehicle.

As illustrated in FIG. 4, the power supply vehicle 30 includes a controller 31, a memory 32, a communication interface 33, a positioner 34, an input interface 35, and an output interface 36.

The controller 31 includes at least one processor, at least one programmable circuit, at least one dedicated circuit, or a combination of these. The controller 31 controls operations of the entire power supply vehicle 30.

The memory 32 includes one or more memories. The memories included in the memory 32 may each function as, for example, a main memory, an auxiliary memory, or a cache memory. The memory 32 stores any information used for the operations of the power supply vehicle 30. For example, the memory 32 may store a system program, an application program, a database, map information, and the like. The information stored in the memory 32 may be updated with, for example, information acquired from the network 40 via the communication interface 33.

The communication interface 33 includes at least one interface for communication for connecting to the network 40. The interface for communication is compliant with, for example, a mobile communication standard, a wired LAN standard, or a wireless LAN standard, but not limited to these, and may be compliant with any communication standard. In the present embodiment, the power supply vehicle 30 communicates with the information processing apparatus 10 via the communication interface 33 and the network 40.

The positioner 34 includes one or more apparatuses configured to acquire positional information for the power supply vehicle 30. Specifically, the positioner 34 includes, for example, a receiver compliant with GPS, but is not limited to this example and may include a receiver compliant with any appropriate satellite positioning system.

The input interface 35 may include at least one input device for detecting input. The input device is a physical key, a capacitive key, a touch screen integrally provided with a display, a microphone for accepting audio input, a camera, or the like, for example, but is not limited to these. The input interface 25 may include an interface for connecting to an external input device.

The output interface 36 may include at least one output device for outputting information to notify the user of the information. The output device is a display for outputting information as video, a speaker for outputting information as audio, or the like, for example, but is not limited to these. The output interface 36 may include an interface for connecting to an external output device.

(Flow of Operations of Information Processing Apparatus)

Figure 5:
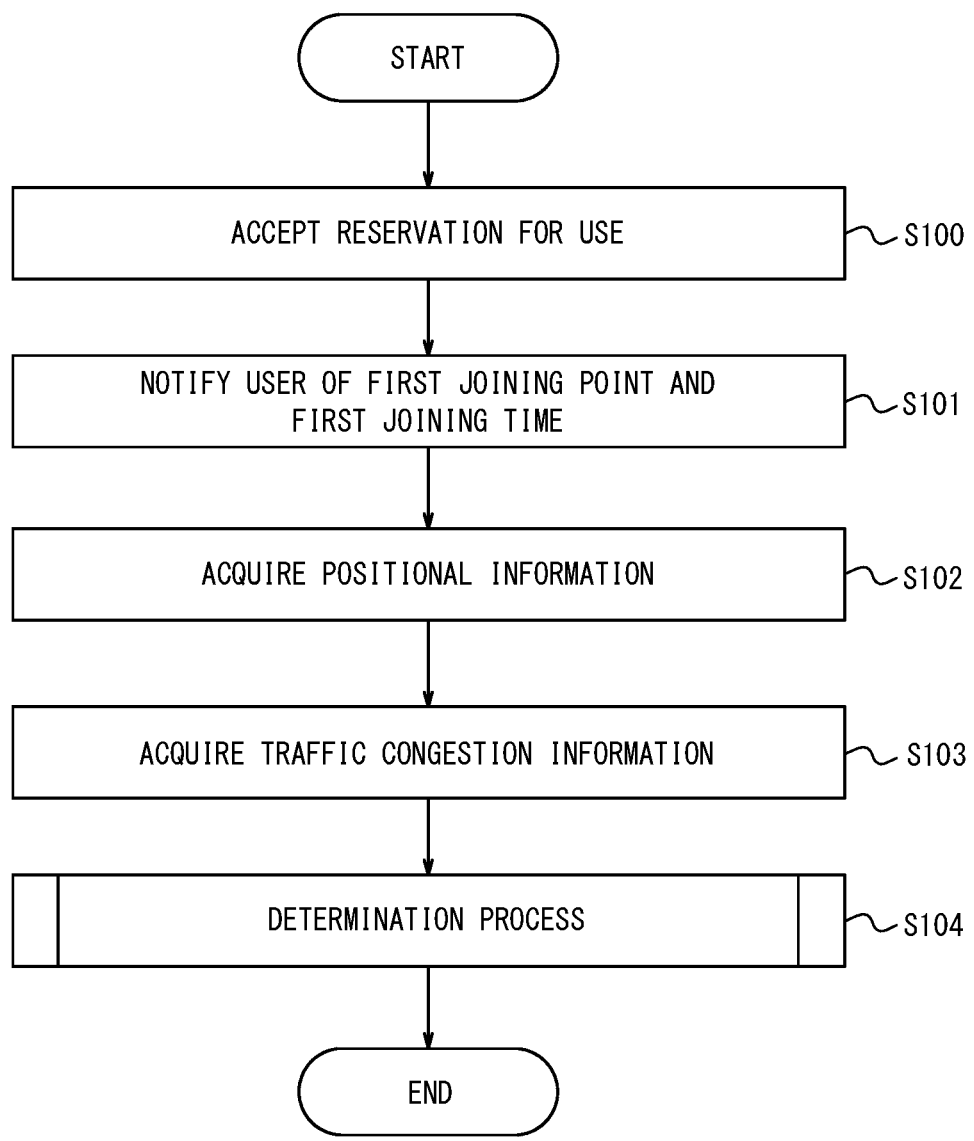
FIG. 5 is a flowchart illustrating operations of the information processing apparatus according to the present embodiment.

Operations of the information processing apparatus 10 according to the present embodiment will be described with reference to FIG. 5. These operations correspond to a method according to the present embodiment. The information processing apparatus 10 is described below as transmitting and receiving information to and from each apparatus via the communication interface 13 and the network 40.

Step S100: The controller 11 of the information processing apparatus 10 accepts a reservation for use of the vehicle charging service from the user of the vehicle V.

In the present embodiment, for example, the user of the vehicle V operates the terminal apparatus 20 to make a reservation for use of the vehicle charging service. At this time, information about the vehicle V, positional information and traffic congestion information may be transmitted from the terminal apparatus 20. The controller 11 of the information processing apparatus 10 addresses the power supply vehicle 30 that can most efficiently join the vehicle V from these information on the vehicle V.

Step S101: The controller 11 determines and notifies the user of the first joining point and the first joining time as the target joining point and target joining time where the vehicle V will join the power supply vehicle 30.

The target joining point is the point set as the point where the vehicle V joins the power supply vehicle 30 for charging. The target joining time refers to the time set as the time when both vehicles join each other at the target joining point.

Any method can be employed to determine the first joining point and the first joining time. For example, the controller 11 may determine a point on the predetermined travel route of the vehicle V at which the two vehicles can join each other most efficiently based on the positional information and the traffic congestion information for the vehicle V obtained in step S101 (for example, a point where the waiting time of one vehicle arriving first is minimized) as the first joining point. The time at which the vehicles are expected to join each other at the first joining point may be determined as the first joining time.

Any appropriate method can be adopted to notify the user. For example, the controller 11 may notify the user by displaying the first joining point and the first joining time on the map in the output interface 26 of the terminal apparatus 20, or in the form of voice guidance.

Step S102: The controller 11 acquires positional information for the vehicle V.

Any method can be employed to acquire the positional information. For example, the terminal apparatus 20 may measure the current position of the vehicle V by the positioner 24 and transmit it to the information processing apparatus 10 via the communication interface 23 and the network 40. The positional information may be acquired any number of times at any given time after notification of the first joining point and the first joining time.

Step S103: The controller 11 acquires traffic congestion information for the vehicle V.

Any method can be employed to acquire the traffic congestion information. For example, the controller 11 may obtain information on the direction of travel of the vehicle V and traffic congestion information on surrounding roads via the network 40. The acquisition of traffic congestion information may be performed any number of times at any given time after notification of the first joining point and the first joining time.

Step S104: the controller 11 executes the determination process based on the positional information and traffic congestion information for the vehicle V.

Specific examples of the determination process are described below, but in outline, the controller 11 determines whether or not the vehicle V can arrive at the first joining point by the first joining time. If it is determined that the vehicle cannot arrive, the controller 11 determines a second joining point that is closer to the vehicle V than the first joining point and notifies the user with a proposal to change the target joining point to the second joining point.

(Determination Process)

Figure 6:
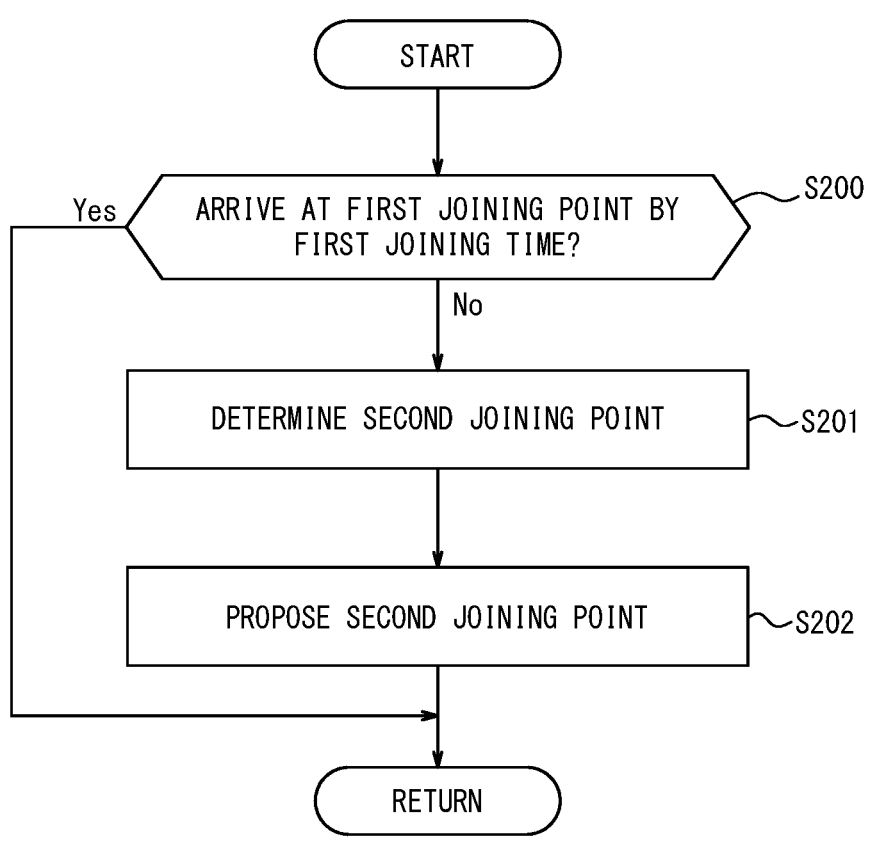
FIG. 6 is a flowchart illustrating a determination process of the information processing apparatus according to the present embodiment.

The determination process in step S104 described above is explained with reference to FIG. 6.

Step S200: the controller 11 determines whether the vehicle V can arrive at the first joining point by the first joining time based on the positional information in step S103 and the traffic congestion information in step S104 described above. When it is determined that the vehicle V can arrive at the first joining point by the first joining time (step S200—Yes), the process ends. Conversely, in a case in which it is determined that the vehicle V cannot arrive at the first joining point by the first joining time (S200—No), the process proceeds to S201.

In the present embodiment, the controller 11 proceeds to step S201 when the estimated time of arrival of the vehicle V at the first joining point is one minute or more after the first joining time. In other embodiments, however, the conditions for proceeding to step S201 may be set arbitrarily. For example, the controller 11 may be set to proceed to step S201 when the estimated arrival time of the vehicle V is 5 minutes or 10 minutes after the first joining time, etc.

Step S201: If it is determined in step S200 that the vehicle V cannot arrive at the first joining point by the first joining time (step S200-No), the controller 11 determines a second joining point that is closer to the vehicle V than the first joining point.

In the present embodiment, the controller 11 determines the second joining point before the first joining point as the target joining point in the direction of travel along the travel path of the vehicle V. In other words, the controller 11 determines the second joining point that is closer to the vehicle V than the first joining point on the travel path of the vehicle V as the target joining point.

Based on the positional information for the vehicle V in step S103 and the traffic congestion information in step S104 described above, as well as the positional information and traffic congestion information for the power supply vehicle 30, the controller 11 may determine the second joining point to satisfy the first constraint condition that both the vehicle V and the power supply vehicle 30 are able to arrive by the second joining time. This reduces wasted standby time for both the vehicle V and the power supply vehicle 30.

In addition to or instead of the first constraint condition, the controller 11 may determine the second joining point to satisfy the second constraint condition that the power supply vehicle 30 has a sufficient power source to travel on going and return routes. This eliminates the concern of the power supply vehicle 30 itself running out of power and allows for smooth provision of vehicle charging services.

Step S202: The controller 11 notifies the user of the proposal to change the second joining point determined in step S201 to the target joining point. The process then ends.

Any appropriate method can be adopted to notify the user. For example, the controller 11 may notify the user by displaying the second joining point on the map on the output interface 26 of the terminal apparatus 20, or in the form of voice guidance.

Thus, according to the determination process, it is determined in step S200 whether or not the vehicle V can arrive at the first joining point by the first joining time, and if it is determined that it cannot arrive, a second joining point is determined in step S201, and the second joining point is notified to the user in step S202.

As described above, the information processing apparatus 10 accepts a reservation for use of the vehicle charging service from a user of the vehicle V and notifies the user of the first joining point and the first joining time as the target joining point and target joining time where the vehicle V will join the power supply vehicle 30. The information processing apparatus 10 determines whether or not the vehicle V can arrive at the first joining point by the first joining time based on the positional information and the traffic congestion information for the vehicle V, and if it is determined that the vehicle V cannot arrive, it determines the second joining point that is closer to the vehicle V than the first joining point. The information processing apparatus 10 then notifies the user of the proposal to change the target joining point to the second joining point.

According to such a configuration, when a reservation for use of the vehicle charging service is accepted from a user of the vehicle V, the first joining point and the first joining time are notified to the user. If it is determined that the vehicle V cannot arrive at the first joining point by the first joining time, a second joining point closer to the vehicle V than the first joining point is notified to the user as the target joining point. If the vehicle V is unable to arrive at the first joining point by the first joining time, there is wasted standby time for the power supply vehicle 30. If the vehicle V changes the target joining point to the second joining point and both vehicles join each other at the second joining point, the waiting time of the power supply vehicle 30 can be reduced. This will improve the technology for providing vehicle charging services.

While the present disclosure has been described with reference to the drawings and examples, it should be noted that various modifications and revisions may be implemented by those skilled in the art based on the present disclosure. Accordingly, such modifications and revisions are included within the scope of the present disclosure. For example, functions or the like included in each component, each step, or the like can be rearranged without logical inconsistency, and a plurality of components, steps, or the like can be combined into one or divided.

For example, the configuration and operations of the information processing apparatus 10 in the above embodiment may be distributed to multiple computers capable of communicating with each other. An embodiment in which some or all of the components of the information processing apparatus 10 are provided in the terminal apparatus 20 can also be implemented.

In the embodiment described above, the operation flow of the information processing apparatus 10 was divided into steps S100-S104 and S200-S202. However, embodiments in which some of the steps are performed together or some of the steps are omitted are also possible.

In the embodiment described above, an example where the second joining point is determined on the predetermined travel path of the vehicle V was described. However, the second joining point may be determined on a detour route different from that of the vehicle V. In such a case, the controller 11 of the information processing apparatus 10 may grant an incentive to the user if the second joining point is on the detour route of the vehicle V and the user accepts the change. If the second joining point is on a detour route for the vehicle V, the user may prefer to join at the first joining point on the vehicle V's travel route and may not accept the change. In such a case, providing incentives to users who accept the change would likely increase the number of users who accept the change. This reduces the amount of time wasted waiting for the power supply vehicle 30.

The incentive can be anything that motivates the user to change to the second joining point. For example, the incentive may be a reduced fee for the vehicle charging service, or points (e.g., mileage or electronic money) awarded for using the vehicle charging service, or additional goods or services provided to the user for using the vehicle charging service.

For example, an embodiment in which a general purpose computer functions as the information processing apparatus 10 according to the above embodiment can also be implemented. Specifically, a program in which processes for realizing the functions of the information processing apparatus 10 according to the above embodiment are written may be stored in a memory of a general purpose computer, and the program may be read and executed by a processor. Accordingly, the present disclosure can also be implemented as a program executable by a processor, or a non-transitory computer readable medium storing the program.

In the embodiment described above, the power supply vehicle 30 may be an automatic vehicle that does not require operation by a driver. In such a case, the controller 11 of the information processing apparatus 10 may control the automatic operation of each of the power supply vehicle 30 by sending instructions to each of them to operate in accordance with the determined operation plan.

The invention claimed is:

1. A system comprising:
an information processing apparatus comprising a controller; and
a plurality of power supply vehicles, each power supply vehicle comprising a controller and either a storage battery to charge a user vehicle or a device for supplying power with a storage battery to charge the user vehicle,
wherein the controller of the information processing apparatus is configured to:
accept a reservation for use of a vehicle charging service from a terminal apparatus used by a user of the user vehicle via a network, the reservation including first positional information for the user vehicle acquired by a Global Positioning System (GPS) receiver of the terminal apparatus;
based on the first positional information, select a power supply vehicle to join the user vehicle from among the plurality of power supply vehicles and determine a first joining point and a first joining time as a target joining point and a target joining time at which the user vehicle joins the power supply vehicle;
notify the user of the first joining point and the first joining time by transmitting the first joining point and the first joining time to the terminal apparatus via the network to cause the first joining point and the first joining time to be displayed on a map in a display of the terminal apparatus;
repeatedly acquire, from the terminal apparatus via the network, second positional information for the user vehicle acquired by the GPS receiver of the terminal apparatus;
repeatedly acquire, via the network, traffic congestion information on roads in a vicinity of the user vehicle;
in response to each acquisition of the second positional information and the traffic congestion information, determine whether the user vehicle can arrive at the first joining point by the first joining time based on the second positional information and the traffic congestion information;
determine a second joining point closer to the user vehicle than the first joining point based on the second positional information upon determining that the user vehicle cannot arrive at the first joining point by the first joining time; and
notify the user of a proposal to change the target joining point at which the user vehicle joins the power supply vehicle that has been selected based on the first positional information to the second joining point by transmitting the second joining point to the terminal apparatus via the network to cause the second joining point to be displayed on the map in the display of the terminal apparatus,
the each power supply vehicle is an automated vehicle that does not require operation by a driver,
the controller of the information processing apparatus is further configured to:
determine an operation plan including the target joining point and the target joining time; and
transmit, via the network, instructions to the each power supply vehicle to perform autonomous driving to the target joining point in accordance with the determined operation plan, and
the controller of the each power supply vehicle is configured to:
receive, via the network, the instructions from the information processing apparatus; and
in response to the received instructions, perform the autonomous driving of the each power supply vehicle to the target joining point.

2. The system according to claim 1, wherein the second joining point is determined to satisfy a first constraint condition that both the user vehicle and the power supply vehicle can arrive by a second joining time based on the second positional information and the traffic congestion information and positional information and traffic congestion information for the power supply vehicle.

3. The system according to claim 1, wherein the second joining point is determined to satisfy a second constraint condition that the power supply vehicle has a sufficient power source to travel on going and return routes.

4. The system according to claim 1, wherein the controller of the information processing apparatus is configured to grant an incentive to the user in a case in which the second joining point is on a detour route of the user vehicle and the user accepts a change.

5. The system according to claim 1, wherein
the controller of the information processing apparatus comprises a processor, a programmable circuit, a dedicated circuit, or a combination thereof.

6. The system according to claim 1, wherein
the controller of the each power supply vehicle comprises a processor, a programmable circuit, a dedicated circuit, or a combination thereof.

* * * * *